(12) United States Patent
Aso (10) Patent No.: US 11,554,428 B2
(45) Date of Patent: Jan. 17, 2023

(54) CUTTING INSERT (71) Applicant: TUNGALOY CORPORATION, Fukushima (JP)

(72) Inventor: Takahiro Aso, Iwaki (JP)

(73) Assignee: TUNGALOY CORPORATION, Fukushima (JP)

( * ) Notice: Subject to any disclaimer, the term of this patent is extended or adjusted under 35 U.S.C. 154(b) by 0 days.

(21) Appl. No.: 17/376,545

(22) Filed: Jul. 15, 2021

(65) Prior Publication Data

US 2022/0072635 A1    Mar. 10, 2022

(30) Foreign Application Priority Data

Sep. 7, 2020   (JP) .............................. JP2020-149826

(51) Int. Cl.
*B23C 5/20*    (2006.01)
*B23C 5/06*    (2006.01)
(Continued)

(52) U.S. Cl.
CPC ................ *B23C 5/202* (2013.01); *B23C 5/06* (2013.01); *B23C 5/109* (2013.01); *B23C 5/2213* (2013.01);
(Continued)

(58) Field of Classification Search
CPC ............ B23C 2200/12; B23C 2200/08; B23C 2200/16; B23C 2200/161;
(Continued)

(56) References Cited

U.S. PATENT DOCUMENTS 6,921,233 B2 *   7/2005   Duerr .................... B23C 5/2213
                                                          407/34
8,858,127 B2 *  10/2014   Satran ..................... B23C 5/202
                                                          407/42

(Continued)

FOREIGN PATENT DOCUMENTS

WO       2016060195 A1    4/2016

*Primary Examiner* — Nicole N Ramos
(74) *Attorney, Agent, or Firm* — Studebaker & Brackett PC (57) ABSTRACT

A cutting insert suitable for a small-diameter milling tool is provided. A cutting insert has a rake face, a bottom surface, a circumferential side surface, and a through hole. A first ridgeline at which the rake face and the circumferential side surface intersect each other includes a first main cutting edge, and a first corner cutting edge connected to a tip of the first main cutting edge. The bottom surface includes a first bottom surface that comes closer to the rake face gradually toward a side at which the first main cutting edge is located when viewed from a central axis of the through hole, and a second bottom surface that comes closer to the rake face gradually toward a side opposite to the first main cutting edge when viewed from the central axis. A distance between a virtual intersection line, at which a first virtual surface formed by extending the first bottom surface and a second virtual surface formed by extending the second bottom surface intersect each other, and the first main cutting edge decreases from a tip side, at which the tip of the first main cutting edge is located, toward an end side, at which an end opposite to the tip is located, in an extending direction of the first main cutting edge.

5 Claims, 10 Drawing Sheets (51) Int. Cl.
*B23C 5/10* (2006.01)
*B23C 5/22* (2006.01)

(52) U.S. Cl.
CPC .. *B23C 2200/0438* (2013.01); *B23C 2200/08* (2013.01); *B23C 2200/12* (2013.01); *B23C 2200/164* (2013.01)

(58) Field of Classification Search
CPC ........ B23C 2200/162; B23C 2200/164; B23C 2200/165; B23C 5/20; B23C 5/202; B23C 5/109; B23C 5/2213; B23C 5/2304
See application file for complete search history.

(56) References Cited

U.S. PATENT DOCUMENTS

| | | | |
|---|---|---|---|
| 9,475,136 B2* | 10/2016 | Kovac | B23C 5/2213 |
| 9,682,433 B2 | 6/2017 | Choi et al. | |
| 10,343,221 B2* | 7/2019 | Nam | B23C 5/202 |
| 10,350,687 B2* | 7/2019 | Kumoi | B23C 5/20 |
| 2011/0236143 A1* | 9/2011 | Ryu | B23C 5/2213 |
| | | | 407/103 |
| 2012/0230790 A1* | 9/2012 | Uno | B23C 5/109 |
| | | | 408/227 |
| 2013/0115022 A1* | 5/2013 | Ishi | B23C 5/202 |
| | | | 407/100 |
| 2015/0117970 A1* | 4/2015 | Daub | B23C 5/06 |
| | | | 407/42 |
| 2015/0336187 A1* | 11/2015 | Choi | B23C 5/06 |
| | | | 407/113 |
| 2017/0197259 A1* | 7/2017 | Kumoi | B23C 5/202 |
| 2017/0304911 A1 | 10/2017 | Kumoi | |
| 2018/0257155 A1* | 9/2018 | Kitajima | B23C 5/10 |
| 2019/0351492 A1* | 11/2019 | Shiroma | B23C 5/109 |
| 2021/0205902 A1* | 7/2021 | Hayakawa | B23C 5/22 |

* cited by examiner

CUTTING INSERT

CROSS-REFERENCES TO RELATED APPLICATIONS

This application relates to and claims priority from Japanese Patent Application No. 2020-149826, filed on Sep. 7, 2020, the entire disclosure of which is incorporated herein by reference.

BACKGROUND

Field

The present invention relates to a cutting insert.

Description of Related Art

A small-diameter milling tool that can precisely machine a mold or the like is in circulation in the market. As a tool diameter thereof decreases, a wall thickness of a tool body that receives a cutting resistance applied to a cutting insert decreases. As a countermeasure against it, a cutting insert may be disposed such that a radial rake thereof becomes negative. If the tool diameter is the same, a wall thickness of a part that supports a bottom surface of a cutting insert increases as its radial rake becomes negative. On the other hand, in a case in which a thickness of a cutting insert is constant, a bottom surface of an insert attachment seat thereof becomes an outward slope as the radial rake becomes negative. Accordingly, a force component that slides the cutting insert toward an outer circumferential side thereof is generated between the cutting insert and the bottom surface, and the cutting insert is likely to be displaced.

In order to prevent such a displacement, a cutting insert in which a bottom surface of the cutting insert is formed in a wedge shape having a V shape has been proposed (see, for example, WO 2016/060195). When the bottom surface is formed in a V shape, approximately half of the bottom surface on an outer circumferential side thereof is pressed against an insert attachment seat of a tool body and is securely fixed to resist a force of sliding the cutting insert toward the outer circumferential side.

SUMMARY

However, the cutting insert is restrained by the bottom surface and a wall surface of the insert attachment seat of the tool body. There is a slight variation allowed as a tolerance in dimensions of the tool body and the cutting insert, and thus when the bottom surface of the cutting insert is formed in a V shape and is substantially divided into two, an area of the bottom surface involved in the restraint is approximately halved.

Cutting resistances acting on cutting edges of the cutting insert are not uniform. Strict cutting conditions are applied to, in particular, a corner cutting edge among the cutting edges. When a contact area between the bottom surface of the cutting insert and the insert attachment seat of the tool body is small in the vicinity of the corner cutting edge, a restraint force decreases and an edge tip of the corner cutting edge tends to shake. In view of the above circumstances, an object of the present invention is to provide a cutting insert suitable for a small-diameter milling tool.

A cutting insert according to one aspect of the present invention includes a rake face, a bottom surface on a side opposite to the rake face, a circumferential side surface that connects the rake face to the bottom surface, and a through hole that penetrates the rake face and the bottom surface. A first ridgeline at which the rake face and the circumferential side surface intersect each other includes a first main cutting edge, and a first corner cutting edge connected to a tip of the first main cutting edge. The bottom surface includes a first bottom surface that comes closer to the rake face gradually toward a side at which the first main cutting edge is located when viewed from a central axis of the through hole, and a second bottom surface that comes closer to the rake face gradually toward a side opposite to the first main cutting edge when viewed from the central axis. A distance between a virtual intersection line, at which a virtual surface formed by extending the first bottom surface and a virtual surface formed by extending the second bottom surface intersect each other, and the first main cutting edge decreases from a tip side, at which the tip of the first main cutting edge is located, toward an end side, at which an end opposite to the tip is located.

According to this aspect, a portion of the first bottom surface closer to the tip of the first main cutting edge is formed to be wider than a portion closer to the end and be at a larger distance from the virtual intersection line. Since a tip side of the first main cutting edge has the first corner cutting edge, cutting conditions there are stricter than those on other portions of the cutting edge. Although the bottom surface is divided into the first bottom surface and the second bottom surface and an area of contact with an insert attachment seat of a tool body is approximately halved, a large area of contact between the first bottom surface and the insert attachment seat can be secured on the tip side on which the cutting conditions are stricter, and thus an edge tip of the corner cutting edge is unlikely to shake. It is possible to provide a cutting insert that is excellent in machining accuracy and durability and is suitable for a small-diameter milling tool.

In the above aspect, the circumferential side surface may include a first side surface facing the first main cutting edge. The first side surface may be formed such that a distance between the rake face and the first bottom surface increases gradually from the tip side toward the end side in an extending direction of the first main cutting edge.

A cut-in boundary portion (maximum cut-in portion) has stricter cutting conditions than other portions of the cutting edge, similarly to the corner cutting edge. The cut-in boundary portion faces a cast surface or a case-hardened surface of a workpiece that is harder than the other portions and also faces a surface of the workpiece that has been work-hardened due to plastic deformation by cutting. According to this aspect, a thickness of the cutting insert becomes larger on the end side, which is the cut-in boundary portion of the first main cutting edge, than on the tip side. On the end side of the first main cutting edge on which the cut-in boundary portion is located, rigidity of the cutting insert can be secured and durability of the cutting insert can be enhanced.

In the above aspect, when a virtual surface that includes one end of the bottom surface farthest from the rake face and is orthogonal to the central axis is a reference plane, a second ridgeline at which the first bottom surface and the first side surface intersect each other may come closer to the reference plane from the tip side toward the end side in the extending direction of the first main cutting edge. The first main cutting edge may come closer to the reference plane and move away from the second ridgeline gradually from the tip side toward the end side in the extending direction of the first main cutting edge.

When an axial rake is configured to be positive, a wall thickness of a cutting insert tends to be smaller on an end side of a main cutting edge than on a tip side thereof. According to this aspect, although the first main cutting edge can be configured such that an axial rake of a cutting tool is positive, the thickness of the cutting insert can be configured to be larger on the end side, which is the cut-in boundary portion, than on the tip side.

In the above aspect, the circumferential side surface may include a first side surface facing the first main cutting edge. The first side surface may have a flank connected to the first main cutting edge, and a restraint surface that is closer to the first bottom surface than the flank. The flank may be inclined to come closer to the central axis gradually toward the first main cutting edge, and the restraint surface may be formed parallel to the central axis.

According to this aspect, the first side surface facing the first main cutting edge is divided into two or more surfaces. Since the restraint surface is parallel to the central axis of the through hole, it can be suitably restrained to the insert attachment seat of the tool body. Since the flank is inclined toward a central side of the cutting insert, an edge tip angle of the first main cutting edge increases, and the edge tip of the first main cutting edge is unlikely to be chipped.

In the above aspect, the first ridgeline may further include a second main cutting edge located on a side opposite to the first main cutting edge, a first wiper cutting edge connected to the first corner cutting edge, a first inner edge connected to the first wiper cutting edge, and a first connection portion that connects the first inner edge to the second main cutting edge. The circumferential side surface may further include a fourth side surface facing the first inner edge, and a fifth side surface facing the first connection portion. The fifth side surface may protrude in a direction away from a center of the rake face beyond a virtual extension line extending a ridgeline at which the first bottom surface and the fourth side surface intersect each other.

According to this aspect, the fifth side surface facing the first connection portion is formed as a thick portion protruding from the virtual extension line. Rigidity can be secured at the first connection portion, and durability of the cutting insert can be enhanced.

According to the present invention, it is possible to provide a cutting insert suitable for a small-diameter milling tool.

BRIEF DESCRIPTION OF DRAWINGS

FIG. 3 is a plan view showing a rake face of the cutting insert shown in

FIG. 2;

DETAILED DESCRIPTION

Preferred embodiments of the present invention will be described with reference to the accompanying figures. Also, in each figure, those having the same reference numerals have the same or similar configurations. One of features of a cutting insert 10 of an embodiment of the present invention is that a virtual intersection line M, which divides a bottom surface 30 into two in a V shape, intersects main cutting edges 11 and 11' diagonally rather than parallel thereto (see FIG. 4). Since a large contact area between the bottom surface 30 of the cutting insert 10 and an insert attachment seat 3 of a tool body 2 can be secured immediately below corner cutting edges 12 and 12', edge tips of the corner cutting edges 12 and 12' are less likely to shake. This is suitable for a small-diameter milling tool 1 (see FIG. 1) capable of precision machining.

Portions of the cutting insert 10 far from the corner cutting edges 12 and 12' are formed to be thicker while having small contact areas with respect to the insert attachment seat 3, and thus they are unlikely to be chipped. Thicknesses H1, H2, H3, and H4 of the cutting insert 10 at the main cutting edges 11 and 11' increase as distances thereof from tips 11F and 11F' connected to the corner cutting edges 12 and 12' increase (see FIGS. 6 to 9). Further, thickened portions are formed at connection portions 15 and 15' located at corners on sides opposite to the corner cutting edges 12 and 12' with the main cutting edges 11 and 11' interposed therebetween (see FIG. 4). Hereinafter, each configuration will be described in detail with reference to the figures.

Figure 1:
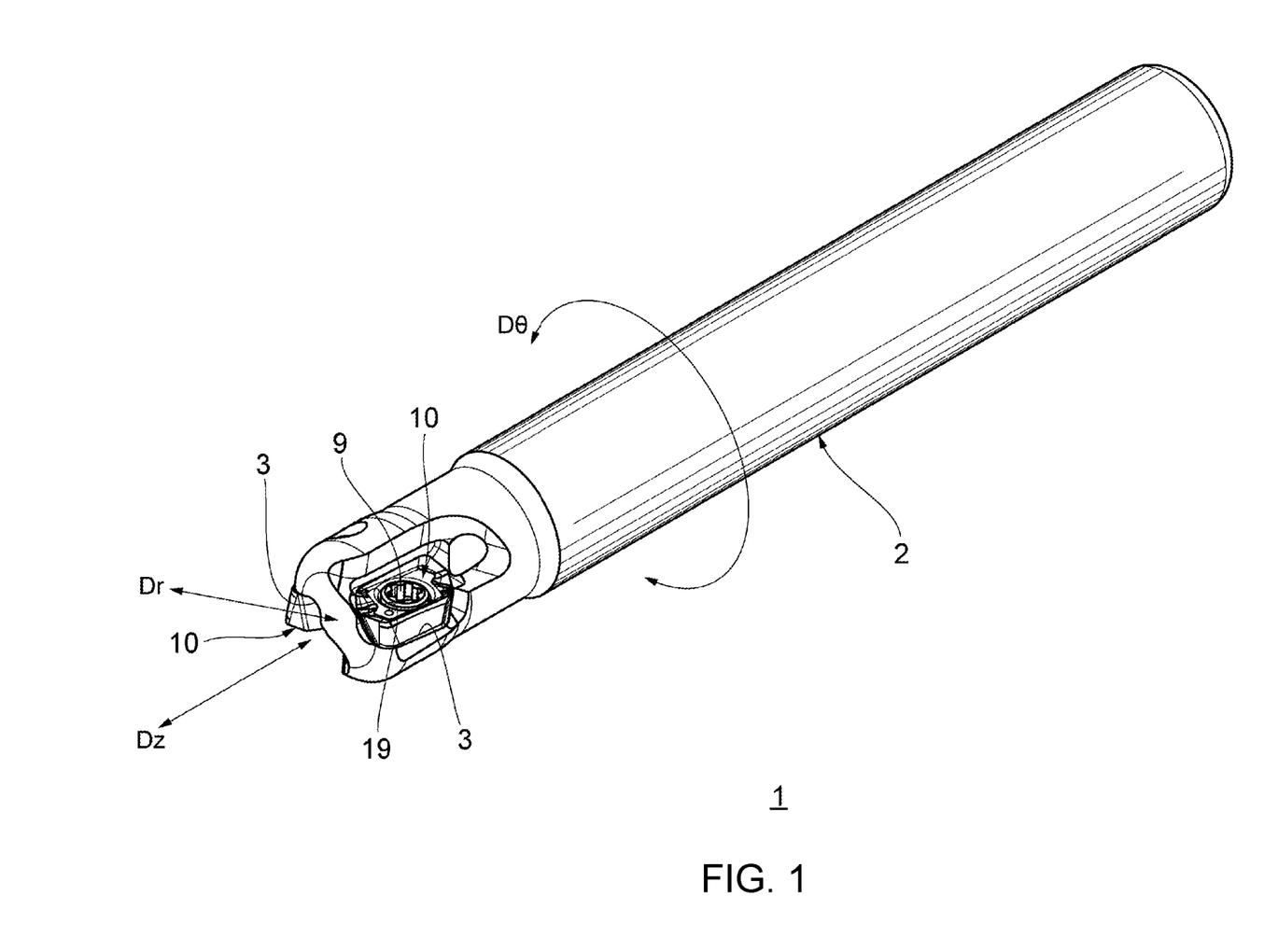
FIG. 1 is a perspective view showing an example of a milling tool on which a cutting insert according to an embodiment of the present invention is mounted.

FIG. 1 is a perspective view showing an example of a milling tool 1 on which the cutting insert 10 according to the embodiment of the present invention is mounted. The milling tool 1 is, for example, an end mill, and includes a replaceable cutting insert 10 and a tool body 2 that fixes the cutting insert 10. The tool body 2 is connected to a main axis of a machine tool. In the illustrated example, the milling tool 1 is configured to cut a workpiece when it rotates counterclockwise when viewed from its tip side on which the cutting insert 10 is mounted.

Each cutting insert 10 is fixed to the insert attachment seat 3 of the tool body 2. In the illustrated example, the insert attachment seat 3 is configured as a screw-on type in which a fastening screw 9 is inserted into a through hole 19 of the cutting insert 10. The insert attachment seat 3 is not limited to a screw-on type and may be a wedge type or the like.

The insert attachment seat 3 is formed to have a seating surface that restrains the cutting insert 10 from the three directions of a circumferential direction Dθ, a radial direction Dr, and an axial direction Dz of the milling tool 1. The seating surface in the circumferential direction Dθ is formed in a V shape and comes into contact with either one of first and second bottom surfaces 31 and 32, which will be described later, from a side circumferentially outward from the tool body 2.

Figure 2:
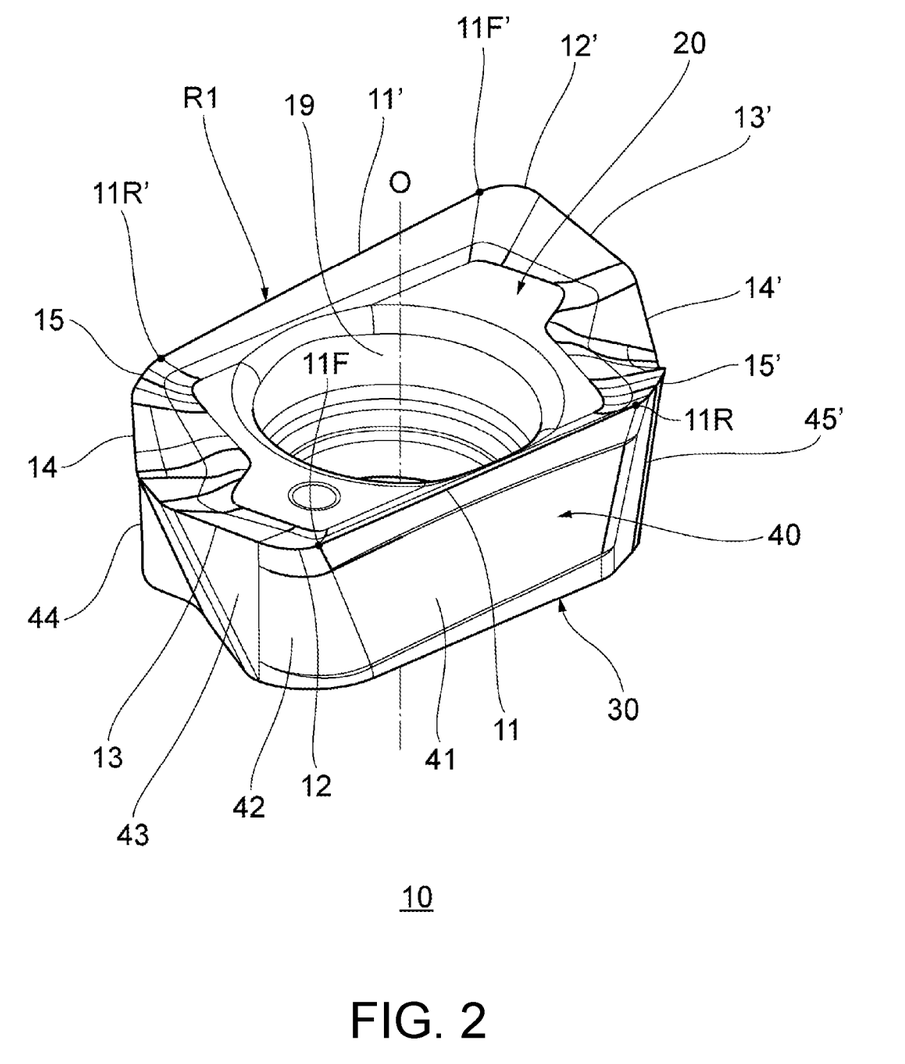
FIG. 2 is a perspective view showing an example of the cutting insert according to the embodiment of the present invention.

FIG. 2 is a perspective view showing an example of the cutting insert 10 according to the embodiment of the present invention. As shown in FIG. 2, the cutting insert 10 has a rake face 20, a bottom surface 30 on a side opposite to the rake face 20, and a circumferential side surface 40 that connects the rake face 20 to the bottom surface 30. The above-mentioned through hole 19 penetrates centers of the rake face 20 and the bottom surface 30. The cutting insert 10 is formed with 180 degree symmetry with respect to a central axis O of the through hole 19 serving as an axis. In the following description, a direction from the bottom surface 30 to the rake face 20 may be referred to as upward, a direction from the rake face 20 to the bottom surface 30 may be referred to as downward, and an axis direction of the central axis O may be referred to as a vertical direction.

The rake face 20 and the circumferential side surface 40 intersect each other at a first ridgeline R1. At least a part of the first ridgeline R1 is formed as a cutting edge. In the illustrated example, the first ridgeline R1 includes, as cutting edges, a pair of main cutting edges (first and second main cutting edges) 11 and 11', a pair of corner cutting edges (first and second corner cutting edges) 12 and 12', a pair of wiper cutting edges (first and second wiper cutting edges) 13 and 13', and a pair of inner edges (first and second inner edges) 14 and 14'. Connection portions (first and second connection portions) 15 and 15' provide connection between the cutting edges (11, 12, 13, and 14) on one side and the cutting edges (11', 12', 13', and 14') on the other side.

The rake face 20 is formed into substantially a parallelogram. The pair of main cutting edges 11 and 11' are located on longer opposite sides of the rake face 20. The pair of corner cutting edges 12 and 12' are located at acute-angled corners of the rake face 20. The pair of wiper cutting edges 13 and 13' and the pair of inner edges 14 and 14' are located on shorter opposite sides of the rake face 20. The connection portions 15 and 15' are located at obtuse-angled corners of the rake face 20. A corner of the rake face 20 is, for example, a portion including a vertex having a maximum curvature of the first ridgeline R1 and its vicinity.

The circumferential side surface 40 includes a pair of first side surfaces 41 and 41', a pair of second side surfaces 42 and 42', a pair of third side surfaces 43 and 43', and a pair of fourth side surfaces 44 and 44', and a pair of fifth side surfaces 45 and 45'. In the circumferential side surface 40, the first side surface 41 is a portion facing the first main cutting edge 11, and the first side surface 41' (shown in FIG. 4) is a portion facing the second main cutting edge 11'. The second side surface 42 is a portion facing the first corner cutting edge 12, and the second side surface 42' (shown in FIG. 4) is a portion facing the second corner cutting edge 12'. The third side surface 43 is a portion facing the first wiper cutting edge 13, and the third side surface 43' (shown in FIG. 4) is a portion facing the second wiper cutting edge 13'. The fourth side surface 44 is a portion facing the first inner edge 14, and the fourth side surface 44' is a portion facing the second inner edge 14'. The fifth side surface 45 (shown in FIG. 10) is a portion facing the first connection portion 15, and the fifth side surface 45' is a portion facing the second connection portion 15'.

Also, the pair of main cutting edges 11 and 11' have substantially the same shape and function. The pair of corner cutting edges 12 and 12' have substantially the same shape and function. The pair of wiper cutting edges 13 and 13' have substantially the same shape and function. The pair of inner edges 14 and 14' have substantially the same shape and function. The pair of connection portions 15 and 15' have substantially the same shape and function. For that reason, as representatives, the first main cutting edge 11, the first corner cutting edge 12, the first wiper cutting edge 13, the first inner edge 14, and the first connection portion 15 will be described in detail, and repeated descriptions of the second main cutting edge 11', the second corner cutting edge 12', the second wiper cutting edge 13', the second inner edge 14', and the second connection portion 15' will be omitted.

Similarly, the pair of first side surfaces 41 and 41' have substantially the same shape and function. The pair of second side surfaces 42 and 42' have substantially the same shape and function. The pair of third side surfaces 43 and 43' have substantially the same shape and function. The pair of fourth side surfaces 44 and 44' have substantially the same shape and function. The pair of fifth side surfaces 45 and 45' have substantially the same shape and function. For that reason, as representatives, the first to fifth side surfaces 41, 42, 43, 44, and 45 will be described in detail, and repeated descriptions of the first to fifth side surfaces 41', 42', 43', 44', and 45' will be omitted.

Figure 3:
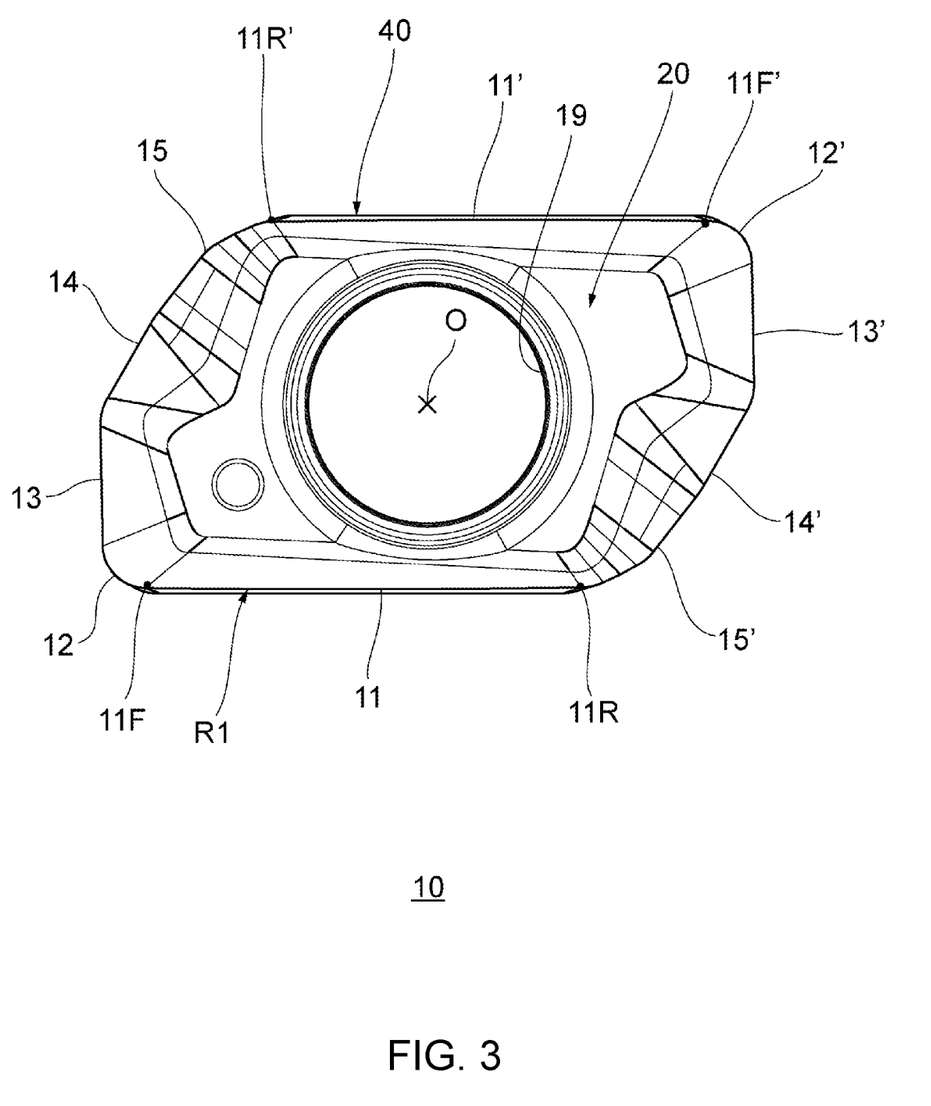

FIG. 3 is a plan view showing the rake face 20 of the cutting insert 10 shown in FIG. 2. As shown in FIG. 3, the main cutting edges 11 and 11' extend in parallel in a longitudinal direction of the rake face 20. In the following description, a direction including the direction from the first main cutting edge 11 to the second main cutting edge 11' and the direction opposite thereto may be referred to as a lateral direction of the rake face 20. In the illustrated example, the main cutting edges 11 and 11' are formed linearly from the tips 11F and 11F' to ends 11R and 11R'. The main cutting edges 11 and 11' may be slightly curved.

In a state in which the cutting insert 10 is mounted on the tool body 2 (see FIG. 1), the main cutting edges 11 and 11' cut the workpiece in the radial direction Dr of the milling tool 1. When the first main cutting edge 11 is used, the first main cutting edge 11 side becomes an outer circumferential side in the radial direction Dr when viewed from the central axis O of the through hole 19, and the second main cutting edge 11' side is a central side in the radial direction Dr when viewed from the central axis O. The tip 11F of the first main cutting edge 11 is disposed on a tip side of the milling tool 1 in the axial direction Dz, and the end 11R is disposed on a base end side thereof in the axial direction Dz (a main shaft side of the machine tool). When the second main cutting edge 11' is used, a positional relationship between the first and second main cutting edges 11 and 11' is reversed.

That is, the first main cutting edge 11 side when viewed from the central axis O of the through hole 19 may be referred to as one side out of the outer circumferential side and the central side of the milling tool 1. The second main cutting edge 11' side when viewed from the central axis O may be referred to as the other side out of the outer circumferential side and the central side of the milling tool 1. The tip 11F side of the first main cutting edge 11 in the extending direction may be referred to as one side out of the tip side and the base end side of the milling tool 1. The end 11R side of the first main cutting edge 11 in the extending direction may be referred to as the other side out of the tip side and the base end side of the milling tool 1.

The corner cutting edges 12 and 12' are connected to the tips 11F and 11F' of the main cutting edges 11 and 11'. The wiper cutting edges 13 and 13' are connected to the corner cutting edges 12 and 12' from sides opposite to the main cutting edges 11 and 11'. The wiper cutting edges extend in the axial direction Dz of the milling tool 1, that is, in a direction substantially orthogonal to the extending direction of the main cutting edges 11 and 11'. The wiper cutting edges 13 and 13' finish a surface of the workpiece cut by the main cutting edges 11 and 11' and the corner cutting edges 12 and 12' to make a finished surface smoother.

The inner edges 14 and 14' are connected to the wiper cutting edges 13 and 13' from sides opposite to the corner cutting edges 12 and 12', and extend in a direction diagonally intersecting the axial direction Dz of the milling tool 1, that is, the extending direction of the main cutting edges 11 and 11'. When a ramping process for cutting in an oblique direction in which the radial direction Dr and the axial direction Dz of the milling tool 1 are combined is performed, the inner edges 14 and 14' cut the workpiece left uncut by the main cutting edges 11 and 11' and the corner cutting edges 12 and 12' that precede in a feeding direction of the milling tool 1.

The connection portions 15 and 15' are formed at the obtuse-angled corners that are not used for cutting, and connect the inner edges 14 and 14' to the ends 11R and 11R' of the main cutting edges 11 and 11'. In the present invention, the wiper cutting edges 13 and 13', the inner edges 14 and 14', and the connection portions 15 and 15' are not essential configurations and may be omitted as appropriate.

Figure 4:
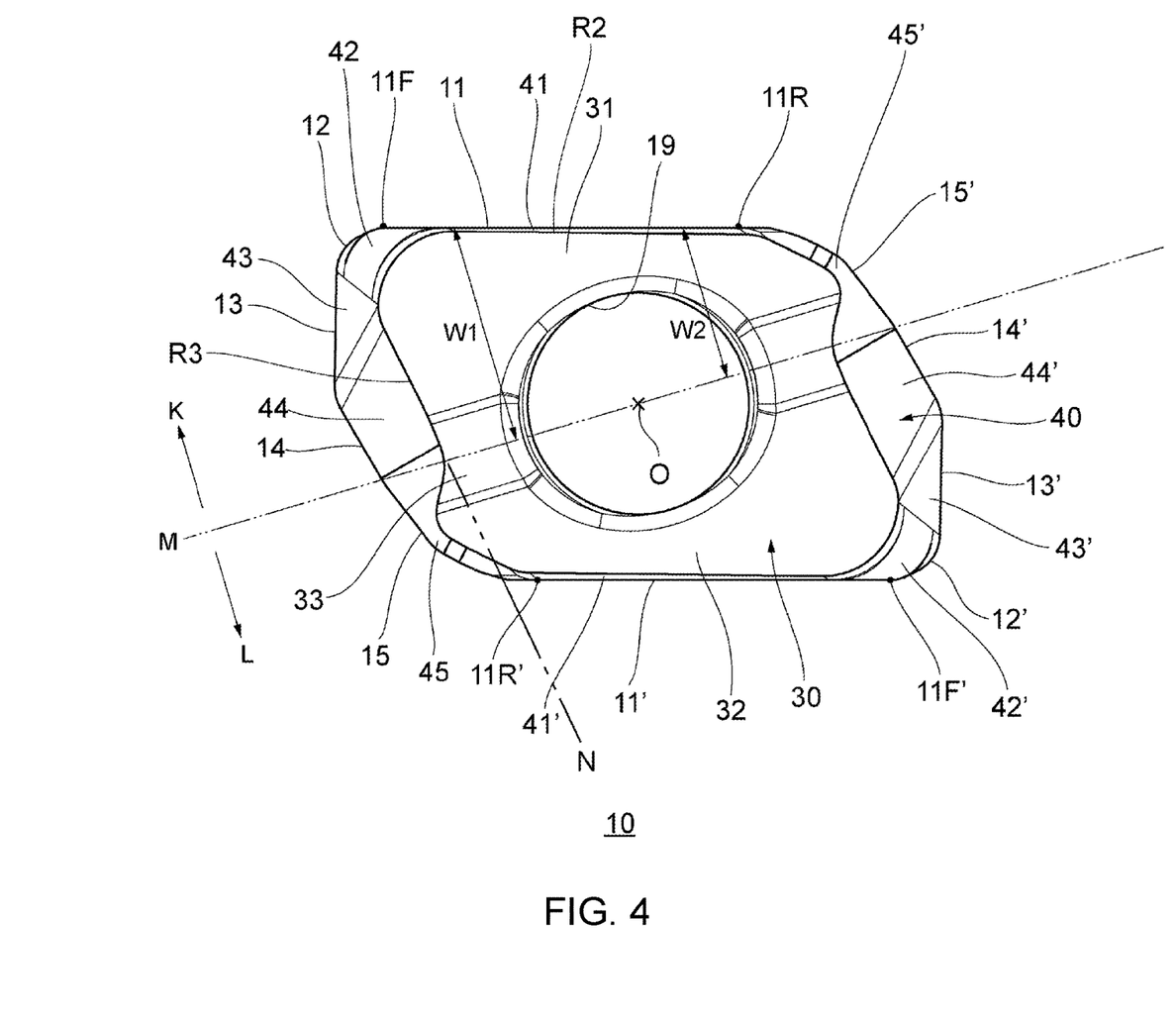
FIG. 4 is a bottom view showing a bottom surface of the cutting insert shown in FIG. 2.

FIG. 4 is a bottom view showing the bottom surface 30 of the cutting insert 10 shown in FIG. 2. The bottom surface 30 is formed in a wedge shape having a V shape and is divided into two or more surfaces. In the illustrated example, the bottom surface 30 includes the first bottom surface 31, the second bottom surface 32 located on a side opposite to the first bottom surface 31, and a central connection surface 33 that provides connection between the first and second bottom surfaces 31 and 32. Each of the surfaces 31, 32, and 33 may be slightly curved. The central connection surface 33 is not an essential configuration and may be omitted as appropriate. The first and second bottom surfaces 31 and 32 are formed to be substantially half a size of the bottom surface 30.

The first bottom surface 31 is inclined to come closer to the rake face 20 toward the first main cutting edge 11 side when viewed from the central axis O of the through hole 19. The second bottom surface 32 is inclined to come closer to the rake face 20 toward the second main cutting edge 11' side when viewed from the central axis O (see FIGS. 6 to 9).

A virtual intersection line M at which a first virtual surface K formed by extending the first bottom surface 31 and a second virtual surface L formed by extending the second bottom surface 32 intersect each other intersects the main cutting edges 11 and 11' not in parallel but diagonally. An example of an extending direction of the virtual intersection line M is an extending direction of the central connection surface 33. In the illustrated example, an angle formed by the main cutting edges 11 and 11' and the virtual intersection line M is 16.5 degrees. The virtual intersection line M has a smaller distance (W1>W2) from the first main cutting edge 11 from the tip 11F side toward the end 11R side in the extending direction of the first main cutting edge 11. That is, the first bottom surface 31 is formed to be wider immediately below the first corner cutting edge 12.

In the illustrated example, a third ridgeline R3 at which the first bottom surface 31 and the fourth side surface 44 intersect each other is formed in a straight line. Similarly, a ridgeline at which the second bottom surface 32 and the fourth side surface 44' intersect each other is formed in a straight line. The fifth side surface 45 facing the first connection portion 15 protrudes to an outer circumferential side (a side opposite to the central axis O) of the cutting insert 10 beyond a virtual extension line N formed by extending the third ridgeline R3 and has a larger wall thickness. That is, the fifth side surfaces 45 and 45' are formed as thickened portions.

Figure 5:
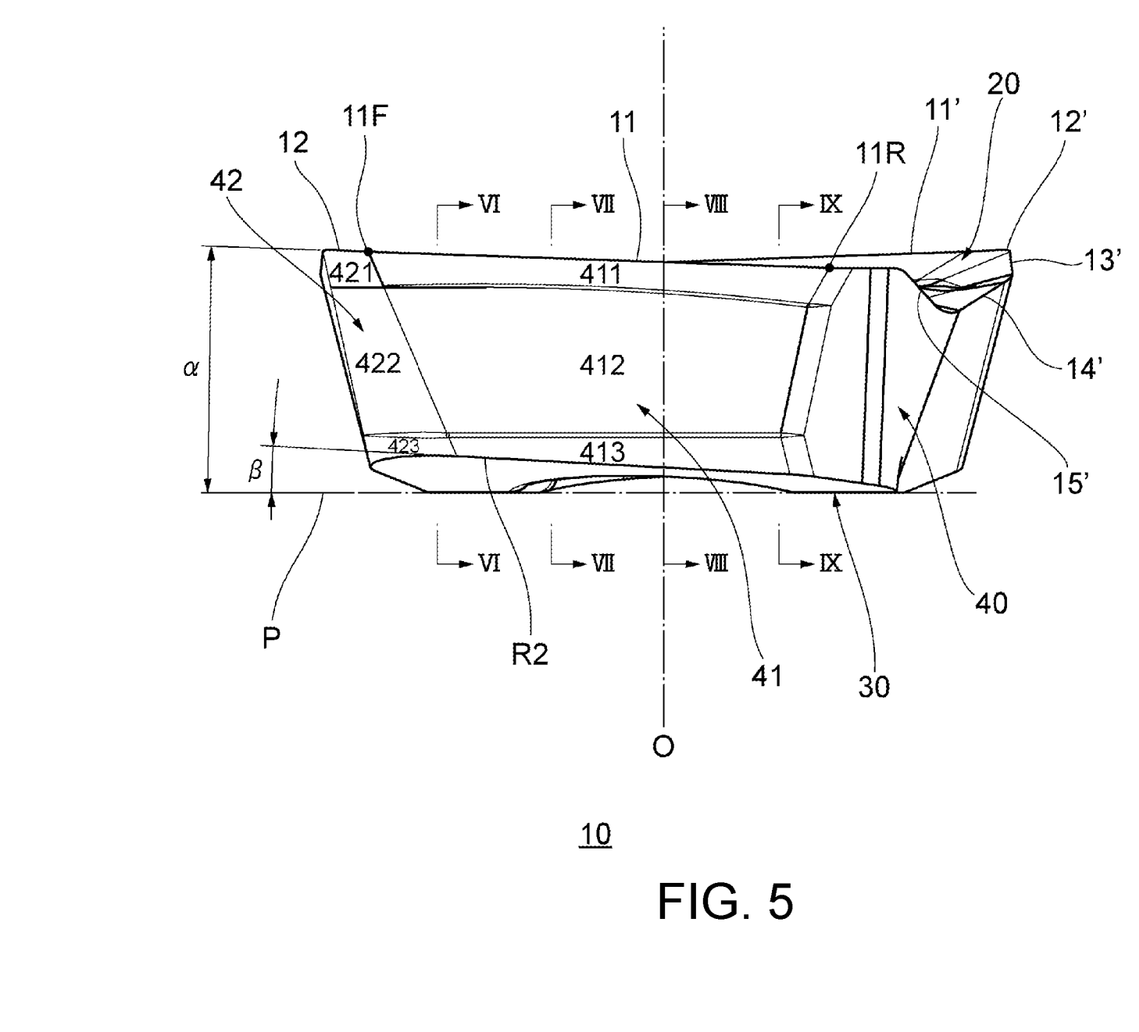
FIG. 5 is a side view showing a first side surface of the cutting insert shown in FIG. 2.
Figure 6:
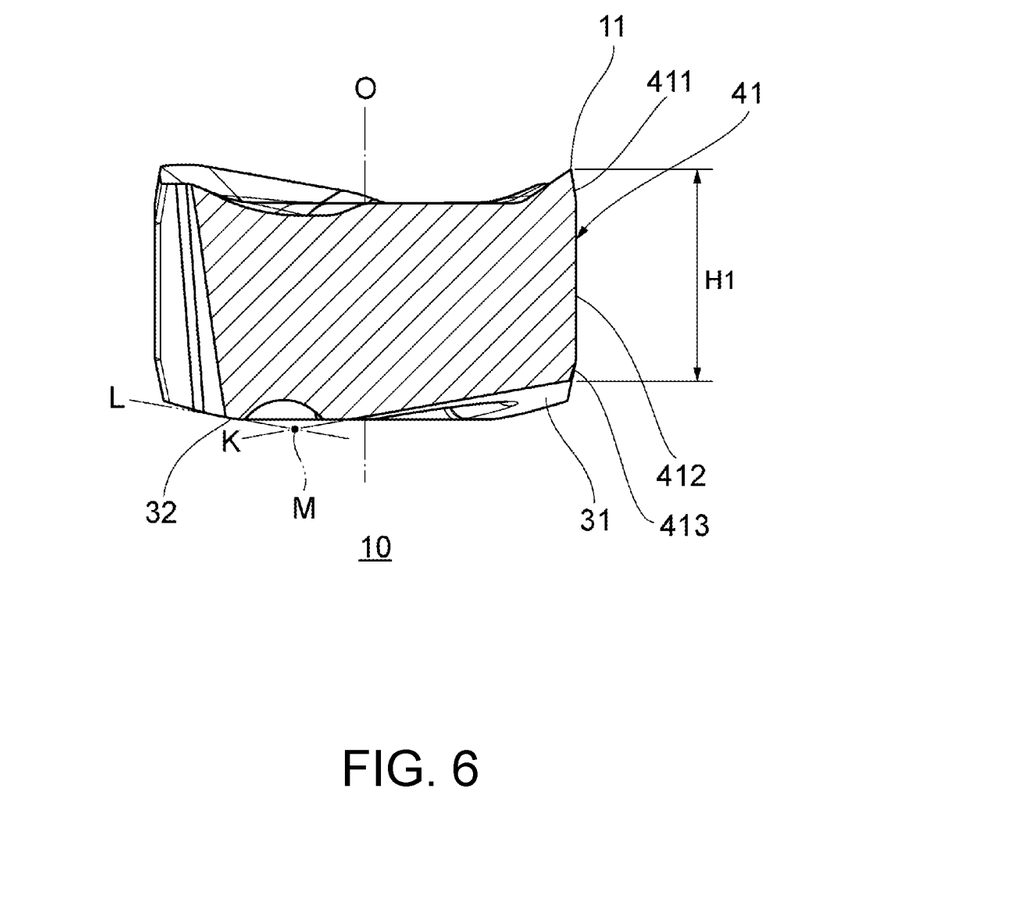
FIG. 6 is a cross-sectional view along line VI-VI in FIG. 5.
Figure 7:
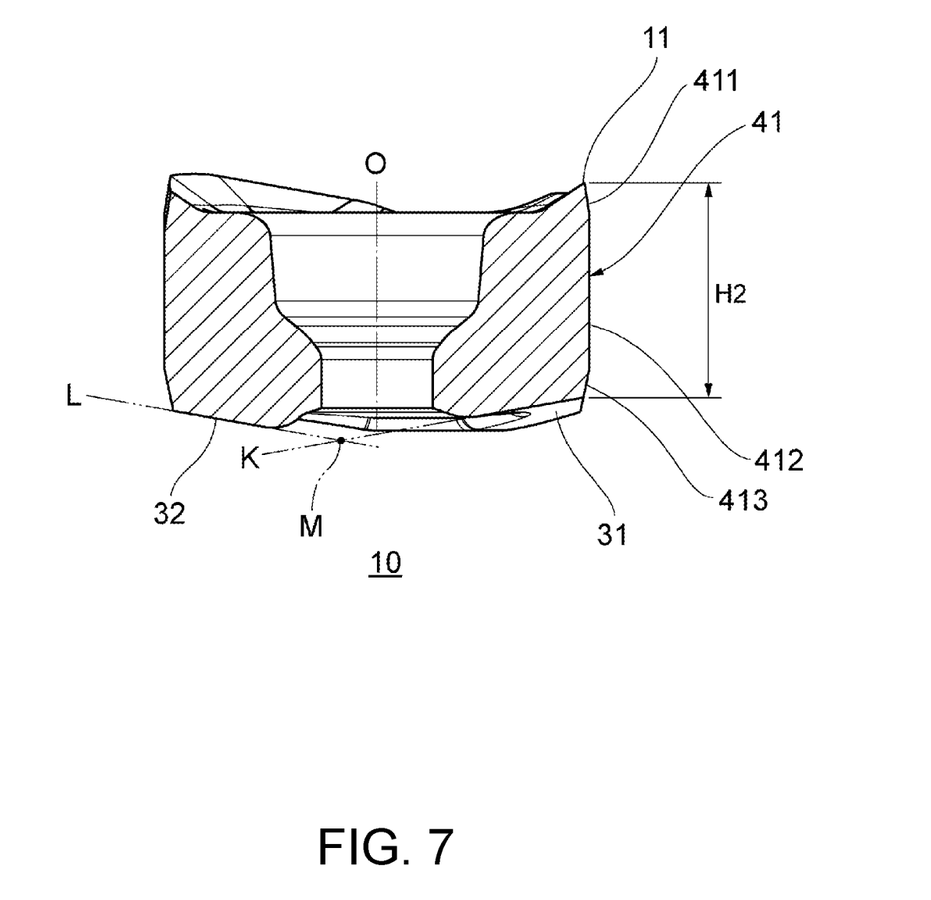
FIG. 7 is a cross-sectional view along line VII-VII in FIG. 5.
Figure 8:
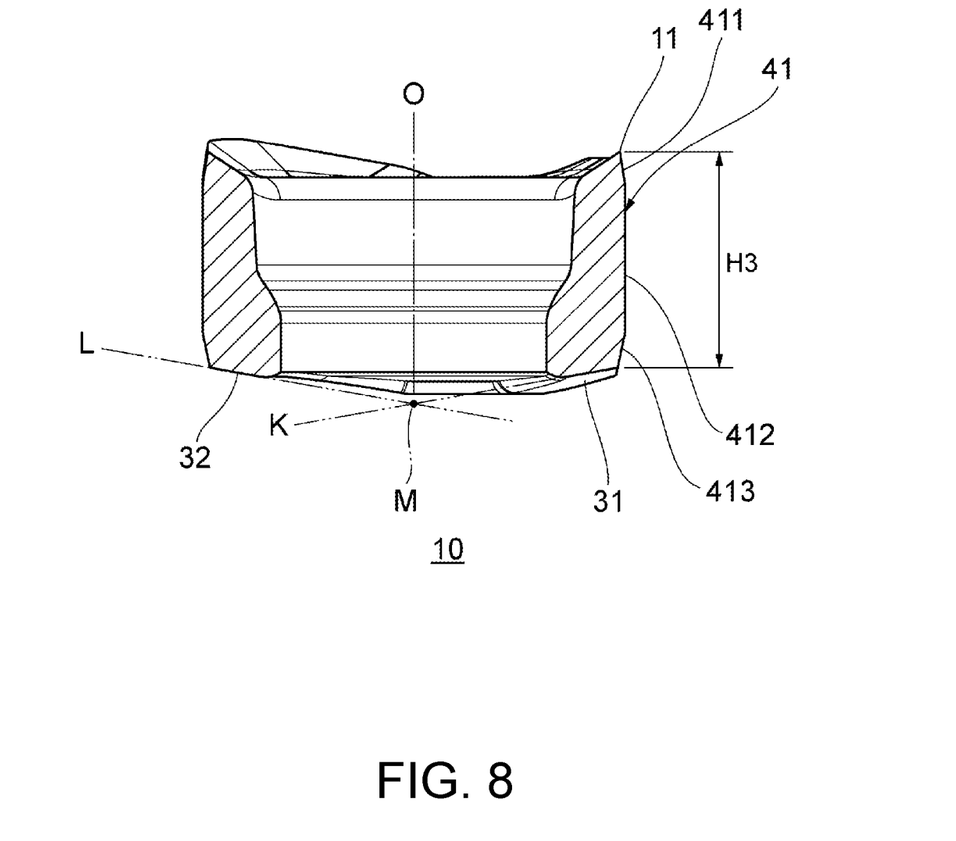
FIG. 8 is a cross-sectional view along line VIII-VIII in FIG. 5.
Figure 9:
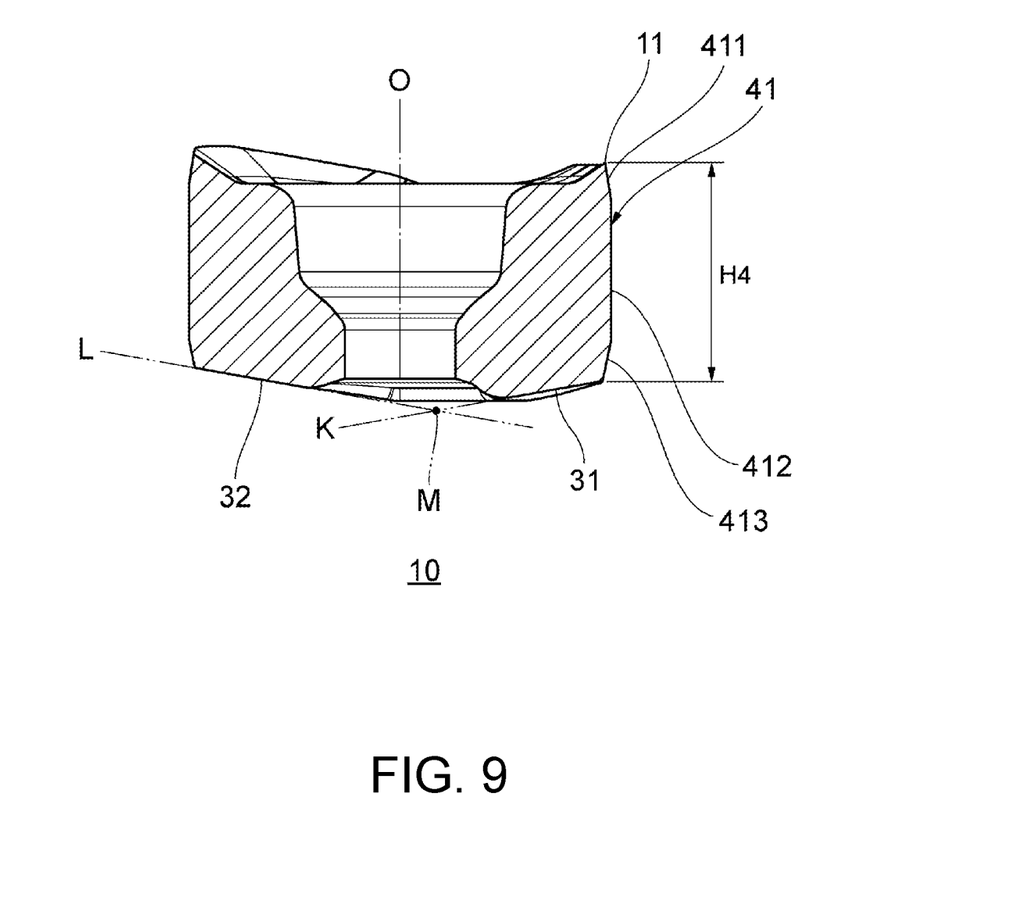
FIG. 9 is a cross-sectional view along line IX-IX in FIG. 5.

FIG. 5 is a side view showing the first side surface 41 of the cutting insert 10 shown in FIG. 2. FIG. 6 is a cross-sectional view along line VI-VI in FIG. 5. FIG. 7 is a cross-sectional view along line VII-VII in FIG. 5. FIG. 8 is a cross-sectional view along line VIII-VIII in FIG. 5. FIG. 9 is a cross-sectional view along line IX-IX in FIG. 5. As shown in FIGS. 6 to 9, the first side surface 41 facing the first main cutting edge 11 is formed such that a distance between the rake face 20 and the first bottom surface 31 (that is, the thickness of the cutting insert 10) increases from the tip 11F side toward the end 11R side in the extending direction of the first main cutting edge 11 (H1<H2<H3<H4).

The description will be made again with reference to FIG. 5. A virtual surface that includes one end (a lower end) of the bottom surface 30 farthest from the rake face 20 in the vertical direction and is orthogonal to the central axis O of the through hole 19 is defined as a reference plane P. The second ridgeline R2 at which the first bottom surface 31 and the first side surface 41 intersect each other is formed to come closer to the reference plane P from the tip 11F side toward the end 11R side in the extending direction of the first main cutting edge 11. The first main cutting edge 11 is formed to come closer to the reference plane P and to move away from the second ridgeline R2 from the tip 11F side toward the end 11R side in the extending direction of the first main cutting edge 11. When an angle formed by the reference plane P and the first main cutting edge 11 is defined as $\alpha$, and an angle formed by the reference plane P and the second ridgeline R2 is defined as $\beta$, the angle $\alpha$ is slightly smaller than the angle $\beta$. In the illustrated example, the angle $\alpha$ is 2 degrees and the angle $\beta$ is 3 degrees.

In the illustrated example, the first side surface 41 facing the first main cutting edge 11 is divided into three surfaces in the vertical direction including a downward direction from the rake face 20 toward the bottom surface 30 and an upward direction reverse thereto and includes an upper surface (a flank) 411, a middle surface (a restraint surface) 412, and a lower surface 413. Similarly, the second side surface 42 facing the first corner cutting edge 12 is divided into three surfaces in the vertical direction and includes an upper surface (a flank) 421, a middle surface 422, and a lower surface 423. The first and second side surfaces 41 and 42 may be divided into two surfaces by omitting the lower surfaces 413 and 423. The lower surfaces 413 and 423 are inclined toward the central axis O side of the through hole 19 toward the bottom surface 30.

The upper surface 411 is a flank connected to the first main cutting edge 11 and is inclined toward the central axis O side of the through hole 19 toward the first main cutting edge 11 (see FIGS. 6 to 9). Similarly, the upper surface 421 is a flank connected to the first corner cutting edge 12 and is inclined toward the central axis O side of the through hole 19 toward the first corner cutting edge 12. The middle surface 412 is configured as the restraint surface that is constrained by the insert attachment seat 3 of the tool body 2 in the radial direction Dr when the second main cutting edge 11' is used. The middle surface 412 is formed parallel to the central axis O of the through hole 19 (see FIGS. 6 to 9).

Figure 10:
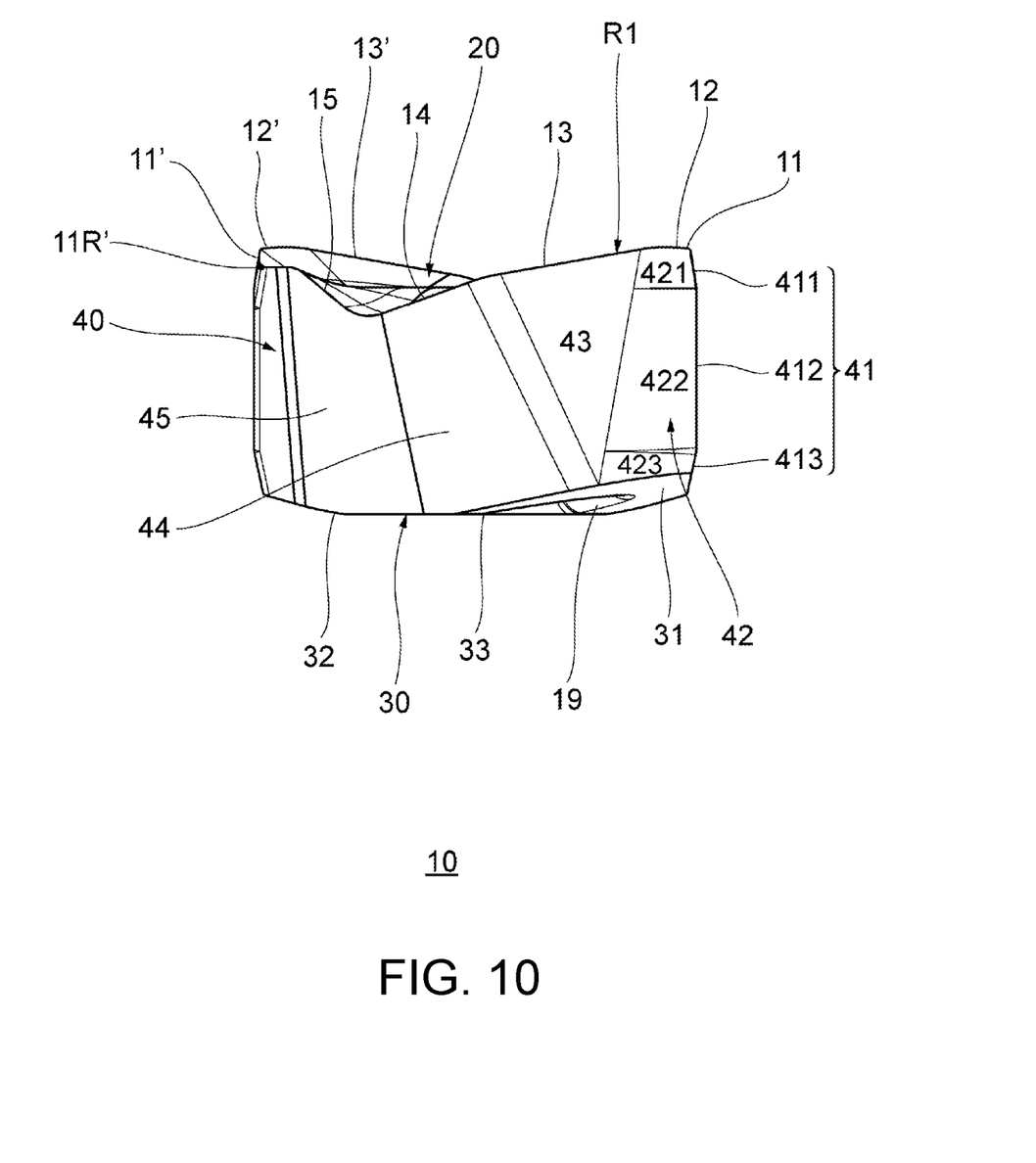
FIG. 10 is a side view showing a second side surface of the cutting insert shown in FIG. 2.

FIG. 10 is a side view showing the second side surface 42 of the cutting insert shown in FIG. 2. As shown in FIG. 10, in the vertical direction, the first corner cutting edge 12 is formed at a position at which a height of the bottom surface 30 from the reference plane P is the highest. The first wiper cutting edge 13 and the first inner edge 14 are formed to gently lower from the first corner cutting edge 12. The first connection portion 15 is formed to rise toward the end 11R' of the second main cutting edge 11'.

The embodiments described above are for facilitating understanding of the present invention and are not for limiting and constructing the present invention. Elements included in the embodiment and their arrangements, materials, conditions, shapes, sizes, and the like are not limited to those exemplified and can be changed as appropriate. In addition, the configurations shown in different embodiments can be partially replaced or combined.

What is claimed is:

1. A cutting insert comprising a rake face, a bottom surface on a side opposite to the rake face, a circumferential side surface that connects the rake face to the bottom surface, and a through hole that penetrates the rake face and the bottom surface, wherein
a first ridgeline at which the rake face and the circumferential side surface intersect each other includes a first main cutting edge, and a first corner cutting edge connected to a tip of the first main cutting edge,
the bottom surface includes a first bottom surface that comes closer to the rake face gradually toward a side at which the first main cutting edge is located when viewed from a central axis of the through hole, and a second bottom surface that comes closer to the rake face gradually toward a side opposite to the first main cutting edge when viewed from the central axis,
a distance between a virtual intersection line, at which a virtual surface formed by extending the first bottom surface and a virtual surface formed by extending the second bottom surface intersect each other, and the first main cutting edge decreases from a tip side, at which the tip of the first main cutting edge is located, toward an end side, at which an end opposite to the tip is located, in an extending direction of the first main cutting edge,
the circumferential side surface includes a first side surface facing the first main cutting edge, and
the first side surface is formed such that a distance between the rake face and the first bottom surface increases from the tip side toward the end side in the extending direction of the first main cutting edge.

2. The cutting insert according to claim 1, wherein
when a virtual surface that includes one end of the bottom surface farthest from the rake face and is orthogonal to the central axis is a reference plane,
a second ridgeline at which the first bottom surface and the first side surface intersect each other comes closer to the reference plane from the tip side toward the end side in the extending direction of the first main cutting edge, and
the first main cutting edge comes closer to the reference plane and moves away from the second ridgeline gradually from the tip side toward the end side in the extending direction of the first main cutting edge.

3. The cutting insert according to claim 1, wherein
the first side surface includes a flank connected to the first main cutting edge, and a restraint surface that is closer to the first bottom surface than the flank,
the flank is inclined to come closer to the central axis gradually toward the first main cutting edge, and
the restraint surface is formed parallel to the central axis.

4. The cutting insert according to claim 1, wherein
the first ridgeline further includes a second main cutting edge located on a side opposite to the first main cutting edge, a first wiper cutting edge connected to the first corner cutting edge, a first inner edge connected to the first wiper cutting edge, and a first connection portion that connects the first inner edge to the second main cutting edge,
the circumferential side surface further includes a fourth side surface facing the first inner edge, and a fifth side surface facing the first connection portion, and
the fifth side surface protrudes in a direction away from a center of the rake face beyond a virtual extension line extending a third ridgeline at which the first bottom surface and the fourth side surface intersect each other.

5. The cutting insert according to claim 3, wherein
the first ridgeline further includes a second main cutting edge located on a side opposite to the first main cutting edge, a first wiper cutting edge connected to the first corner cutting edge, a first inner edge connected to the first wiper cutting edge, and a first connection portion that connects the first inner edge to the second main cutting edge,
the circumferential side surface further includes a fourth side surface facing the first inner edge, and a fifth side surface facing the first connection portion, and
the fifth side surface protrudes in a direction away from a center of the rake face beyond a virtual extension line extending a third ridgeline at which the first bottom surface and the fourth side surface intersect each other.

* * * * *